United States Patent
Rivela (10) Patent No.: US 12,216,213 B2
(45) Date of Patent: Feb. 4, 2025

(54) SYSTEM AND RECEIVER FOR GNSS SIGNALS

(71) Applicant: STMicroelectronics S.r.l., Agrate Brianza (IT)

(72) Inventor: Gaetano Rivela, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 18/312,157

(22) Filed: May 4, 2023

(65) Prior Publication Data

US 2023/0384459 A1 Nov. 30, 2023

(30) Foreign Application Priority Data

May 30, 2022 (IT) .................. 102022000011330

(51) Int. Cl.
　　*G01S 19/24* (2010.01)
　　*G01S 19/04* (2010.01)
(52) U.S. Cl.
　　CPC ............ *G01S 19/243* (2013.01); *G01S 19/04* (2013.01)
(58) Field of Classification Search
　　CPC ............................ G01S 19/243; G01S 19/04
　　See application file for complete search history.

(56) References Cited

U.S. PATENT DOCUMENTS

| | | | | |
|---|---|---|---|---|
| 2004/0048594 A1* | 3/2004 | Okanobu | ............... | H04B 1/005 455/324 |
| 2006/0176215 A1 | 8/2006 | Dubash et al. | | |
| 2007/0096980 A1* | 5/2007 | Gradincic | ............... | G01S 19/32 342/357.73 |
| 2011/0128999 A1* | 6/2011 | Ruegamer | ............... | G01S 19/36 375/147 |
| 2012/0026039 A1 | 2/2012 | Ganeshan et al. | | |

(Continued)

FOREIGN PATENT DOCUMENTS

CN　　　　210351144 U　　4/2020

OTHER PUBLICATIONS

Haddad, Fayrouz, et al., "Polyphase Filter Design Methodology for Wireless Communication Applications", Salma Ait Fares, Mobile and Wireless Communications, Network layer and circuit level design, IntechOpen, doi: 10.5772/7707hal-01895400, Oct. 16, 2018, pp. 219-246.

*Primary Examiner* — Janice N Tieu
(74) *Attorney, Agent, or Firm* — Slater Matsil, LLP (57) ABSTRACT

In accordance with an embodiment, a system includes a phase-locked loop (PLL) configured to provide a first local oscillator (LO) signal and a voltage-controlled oscillator (VCO) signal; a first quadrature demodulator configured to downconvert global navigation satellite system signals to produce a first intermediate frequency (IF) signal; a first signal processing chain configured to pass the first IF signal; a second signal processing chain comprising a first frequency divider configured to produce a second LO signal based on the first LO signal, and a second quadrature demodulator configured to convert the first IF signal to a second IF signal using the second LO signal; and a third signal processing chain comprising a second frequency divider configured to produce a third LO signal based on the VCO signal, and a third quadrature demodulator configured to convert the first IF signal to a third IF signal using the third LO signal.

21 Claims, 4 Drawing Sheets

(56) References Cited

U.S. PATENT DOCUMENTS

2013/0187810 A1\* 7/2013 Leclercq ................. G01S 19/46
                                                           342/357.29
2020/0120632 A1\* 4/2020 Tanaka .................... G01S 19/16

\* cited by examiner

SYSTEM AND RECEIVER FOR GNSS SIGNALS

CROSS-REFERENCE TO RELATED APPLICATIONS

This application claims the benefit of Italian Patent Application No. 102022000011330, filed on May 30, 2022, which application is hereby incorporated herein by reference.

TECHNICAL FIELD

Embodiments generally relate to electronic systems, and more particularly to a system and receiver for GNSS (Global Navigation Satellite System) signals.

BACKGROUND

A currently leading technology for positioning applications is GNSS (Global Navigation Satellite System), which is conventionally used in navigation systems including navigation and telematics. A GNSS system may include a plurality of RF receivers that are each configured to operate in a different frequency band to provide a multi-band multi-constellation positioning receiver.

For instance, GNSS constellations include GPS, Galileo, Glonass, BeiDou, NAVIC (former IRNSS) and QZSS, in L1, L2, L5 and E6 frequency bands.

As the receivers may be a part of an integrated circuit (IC), area footprint and performance of these components are relevant figures of merit.

SUMMARY

One or more embodiments may relate to a corresponding receiver, such as a GNSS receiver.

One or more embodiments use a single RF input and frequency synthesizer, reducing the number of components involved. Therefore, area footprint of the RF receivers in the IC may be reduced.

In one or more embodiments, a main local oscillator LO1 signal is generated (e.g., by a phase locked loop—PLL) as a multiple of a GNSS fundamental frequency (e.g., about 1.023 MHz), increasing design flexibility.

In one or more embodiments, a clock signal (for instance, used to drive a signal processor) may be selected so as to reduce the disturb of the correlator that detects the GNSS signals.

BRIEF DESCRIPTION OF THE DRAWINGS

One or more embodiments will now be described, by way of non-limiting example only, with reference to the annexed Figures, wherein.

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The drawings are in simplified form and are not to precise scale. Throughout the figures annexed herein, like parts or elements are indicated with like references/numerals unless the context indicates otherwise, and for brevity a corresponding description will not be repeated for each and every figure. The references used herein are provided merely for convenience and hence do not define the extent of protection or the scope of the embodiments.

For the sake of simplicity, in the following detailed description a same reference symbol may be used to designate both a node/line in a circuit and a signal which may occur at that node or line.

Some embodiments of the present description relate to the field of navigation, that is the ability of a device to determine a user position, velocity (speed) and attitude (i.e., 3D direction). One or more embodiments may refer to techniques for providing navigation information, for instance using GNSS receivers in multiple frequency bands. Some embodiments may advantageously contribute in reducing an area footprint and increasing performance of the RF receivers in GNSS systems.

A navigation receiver operates by down converting to quasi baseband the input signal received from the satellites, which is transmitted at a plurality of radio-frequency bands, using a local oscillator to step down the input frequency and allow a baseband digital management of the satellite information.

Figure 1:
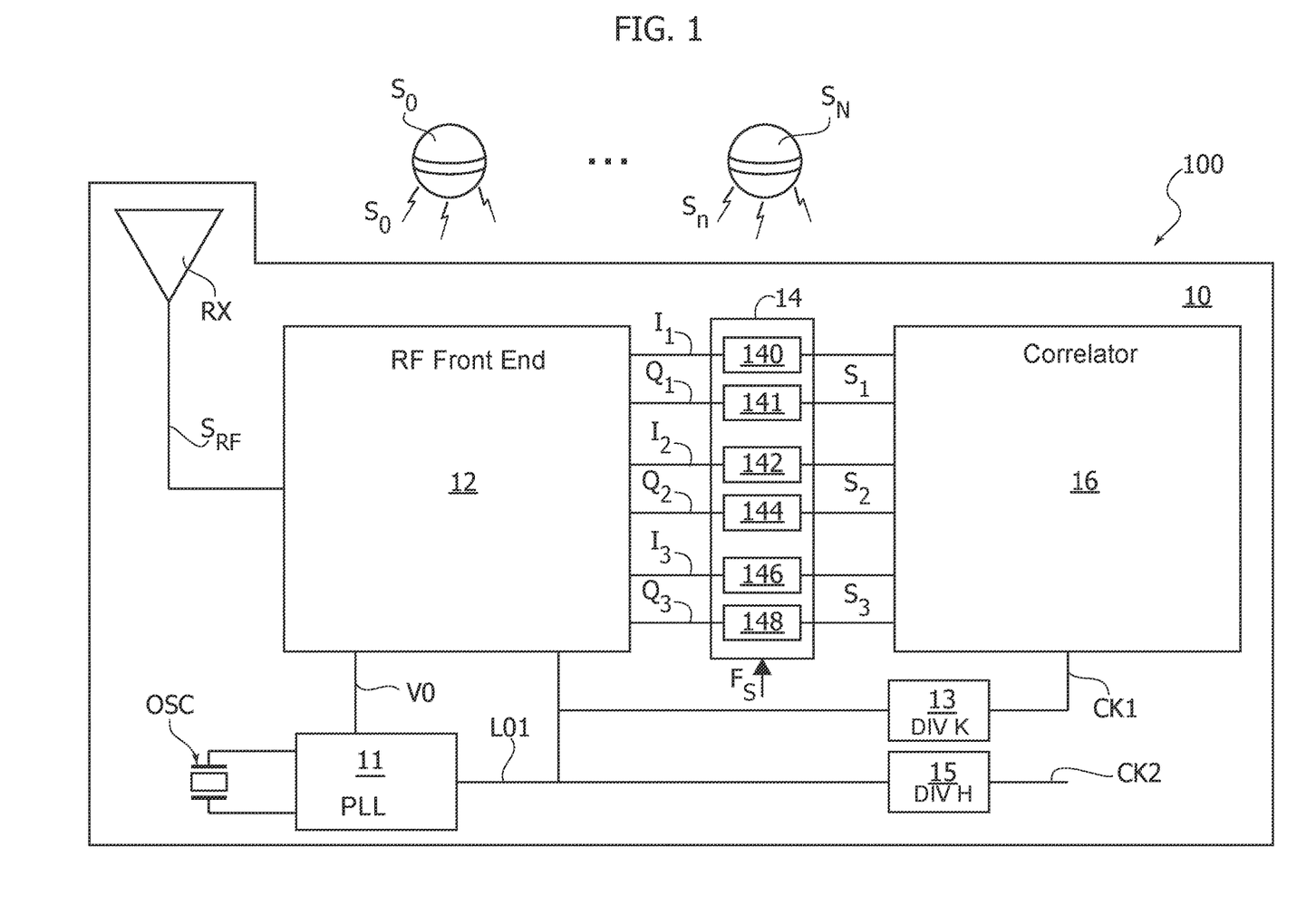
FIG. 1 is a diagram exemplary of a system as per the present disclosure.

With reference to FIG. 1, which diagrammatically shows a GNSS Global Navigation Satellite System) system (such as, for example, Global Positioning System (GPS), Global'naya Navigatsionnaya Sputnikovaya Sistema (GLONASS), Galileo System, or other types of satellite-based positioning systems, such global satellite positioning system comprises a constellation of a number N of satellites $SC_1$-$SC_N$ and at least a receiving apparatus 10.

The receiving apparatus 10 comprises an antenna RX, an analog receiving module AFE (Analog Front End), provided with a radiofrequency (RF) stage 12, and an analog-digital converter 14 (ADC), which can be implemented by hardware modules.

The receiving apparatus 10 may be provided with a central processing unit, memories (mass memory and/or working storage) and respective interfaces (not shown in figures), comprising a microprocessor or microcontroller, for running the software resident in it.

The following embodiments are described in a non-limiting way referring to the GPS technology, however the teachings of the present disclosure can be applied also to other satellite positioning systems.

When the receiving apparatus 10 operates, the antenna RX receives a plurality of signals $S_o, \ldots, S_N$ from one or more satellites $SC_o$-$SC_N$ of the constellation of satellites operating in GNSS system. For example, these signals can be modulated on at least one carrier signal having a carrier frequency $F_C$.

For the sake of simplicity, one or more embodiments are discussed in the following with references to an exemplary case in which a signal $S_{RF}$ having a plurality of spectral portions in a variety of frequency bands, such an example being purely exemplary and in no way limiting.

As exemplified in FIG. 1, a system 10 for receiving and processing GNSS signals in a plurality of radiofrequency (briefly, RF) bands comprises: an antenna RX configured to receive a RF input signal $S_{RF}$, e.g., a RF input signal $S_{RF}$, having a spectral content in a plurality of distinct and separate frequency bands; a RF front-end circuit block 12 coupled to the receiver antenna RX to receive the RF input signal $S_{RF}$ therefrom, the RF signal being a (e.g., frequency) modulated signal that occupies a total bandwidth of BW (in Hertz); a local oscillator OSC configured to produce an oscillating signal OSC; a phase-locked loop (briefly, PLL) 11 coupled to the local oscillator OSC and comprising a voltage-controlled oscillator (briefly, VCO) coupled to the RF front-end 12, the PLL 11 configured to provide a VCO signal VO having a further frequency $F_{VCO}$ and a local oscillator LO1 having a LO signal frequency that is a fraction of the VCO signal frequency $F_{VCO}$, e.g., $F_{LO1}=F_{VCO}/4$.

As exemplified in FIG. 1, the PLL 11 is configured to provide a signal which is an integer multiple of a fundamental frequency set for the GNSS standard (e.g., with fo=1.023 MHz equal to the GNSS frequency, the PLL 11 may provide the VCO signal VO at a frequency about 6.285 GHz, with the local oscillator signal LO1 at a local oscillator frequency about 1571.375 MHz). As exemplified herein, the RF front-end 12 is configured to provide a set of processed signals $I_1, Q_1, I_2, Q_2, I_3, Q_3$.

For the sake of simplicity, one or more embodiments are discussed in the following mainly with respect to an arrangement comprising a number of three spectral portions or frequency bands in which the RF signal $S_{RF}$ is analyzed, such a number of frequency bands being purely exemplary and in no way limiting.

As exemplified in FIG. 1, the set of processed signals $I_1, Q_1, I_2, Q_2, I_3, Q_3$ includes: a first pair of processed signals $I_1, Q_1$, for a first frequency band of the RF signal $S_{RF}$, the first pair of processed signals $I_1, Q_1$ comprising a first signal $I_1$ and a second signal $Q_1$ as a quadrature version of the first signal $I_1$; a second pair of processed signals $I_2, Q_2$ for a second frequency band of the RF signal $S_{RF}$, the second pair of processed signals $I_2, Q_2$ comprising a third signal $I_2$ and a fourth signal $Q_2$ as a quadrature version of the third signal $I_2$; and a third pair of processed signals $I_3, Q_3$ for a third frequency band of the RF signal $S_{RF}$, the third pair of processed signals $I_3, Q_3$ comprising a fifth signal $I_3$ and a sixth signal $Q_3$ as a quadrature version of the fifth signal $I_3$.

As exemplified in FIG. 1, the system 10 further comprises analog-to-digital converter (briefly, ADC) circuitry 14 coupled to the front-end 12 and configured to apply analog-to-digital conversion to the set of processed signals $I_1, Q_1, I_2, Q_2, I_3, Q_3$.

For instance, the ADC circuitry 14 may include: a first pair of ADC circuits 140, 141 configured to receive the first pair of signals $I_1, Q_1$, the first pair of ADC circuits 140, 141 comprising a first ADC circuit 140 configured to apply ADC processing to the first signal $I_1$ and a second ADC circuit 141 configured to apply ADC processing to the second signal $Q_1$; a second pair of ADC circuits 142, 144 configured to receive the second pair of signals $I_2, Q_2$, the second pair of ADC circuits 142, 144 comprising a third ADC circuit 142 configured to apply ADC processing to the third signal $I_2$ and a fourth ADC circuit 144 configured to apply ADC processing to the fifth signal $Q_2$; and a third pair of ADC circuits 146, 148 comprising a fifth ADC circuit 146 configured to apply ADC processing to the fifth signal $I_3$ and a sixth ADC circuit 148 configured to apply ADC processing to the sixth signal $Q_3$.

As exemplified in FIG. 1, the ADC circuitry 14 receives a sampling signal $F_S$ and applies ADC conversion to the pairs of signals $I_1, Q_1, I_2, Q_2, I_3, Q_3$ via sampling such signals at a frequency of the sampling signal $F_S$, in a manner per se known to those of skill in the art. For instance, the sampling signal frequency $F_S$ may be a fraction of the frequency of the VCO signal VO, e.g., $F_S$=VCO/6=1047.583 MHz.

For instance, after the ADC processing 14 is applied, the ADC converted data has a frequency that is a fraction of the sampling signal frequency $F_S$, e.g., Fs/8=130.945 MHz=128*fo.

As exemplified in FIG. 1, the ADC circuitry 14 produces ADC converted signals $S_1, S_2, S_3$, e.g., digital signals indicative of the contents in respective frequency bands of the RF signal $S_{RF}$.

As exemplified in FIG. 1, the system 10 further includes: a first (e.g., programmable) frequency divider 13 coupled to the PLL 11 to receive the local oscillator signal LO1 therefrom, the first frequency divider 13 configured to apply frequency division (e.g., using a first programmable scaling factor K) to the local oscillator signal LO1, providing an adequate clock signal to the GNSS base band processor 16; a second frequency divider 15 coupled to the PLL 11 to receive the local oscillator signal LO1 therefrom, the second frequency divider 15 configured to apply frequency division (e.g., using a second programmable scaling factor H) to the local oscillator signal LO1, providing a clock signal CK2 to further processing circuitry (e.g., an ARM processor); and a base band processor 16 coupled to the ADC circuitry 14 to receive the ADC-converted signals $S_1, S_2, S_3$ therefrom and coupled to the first frequency divider 13 to receive the GNSS clock CK1 therefrom, the base band processor 16 configured to perform GNSS signal processing based on the ADC-converted signals $S_1, S_2, S_3$ and on the GNSS clock CK1 in a manner per se known.

For instance, the VCO in the PLL 11 produces a signal VO at a VCO frequency $F_{VCO}$=6144*fo=6.285 GHz where fo is the fundamental GNSS frequency (e.g., fo=1.023 MHz).

For instance, the local oscillator has a LO frequency $F_{LO1}$ which is a fraction of the VCO frequency (e.g., $F_{LO1}$=VCO/4=1536*fo=1.5713 GHz).

For instance, the first clock CK1 has a frequency $F_{CK1}$ which is a fraction of the local oscillator frequency, e.g., $F_{CK1}=F_{LO1}/K$.

For instance, the scaling factor K of the first frequency divider 13 may have the exemplary values illustrated in Table I provided at the end of the description, which is exemplary of possible relationships between scaling factor K and local oscillator frequency, with factor of multiplication n indicating the integer multiple of the fundamental GNSS frequency.

For instance, it may be preferable to use of signals whose frequency is a multiple of the fundamental GNSS frequency fo so as to facilitate processing of ADC converted data and of software library development.

For instance, the possibility to vary the clock frequency in a programmable manner facilitates current saving in case the system is used to process a subset of the incoming GNSS signals.

Figure 2:
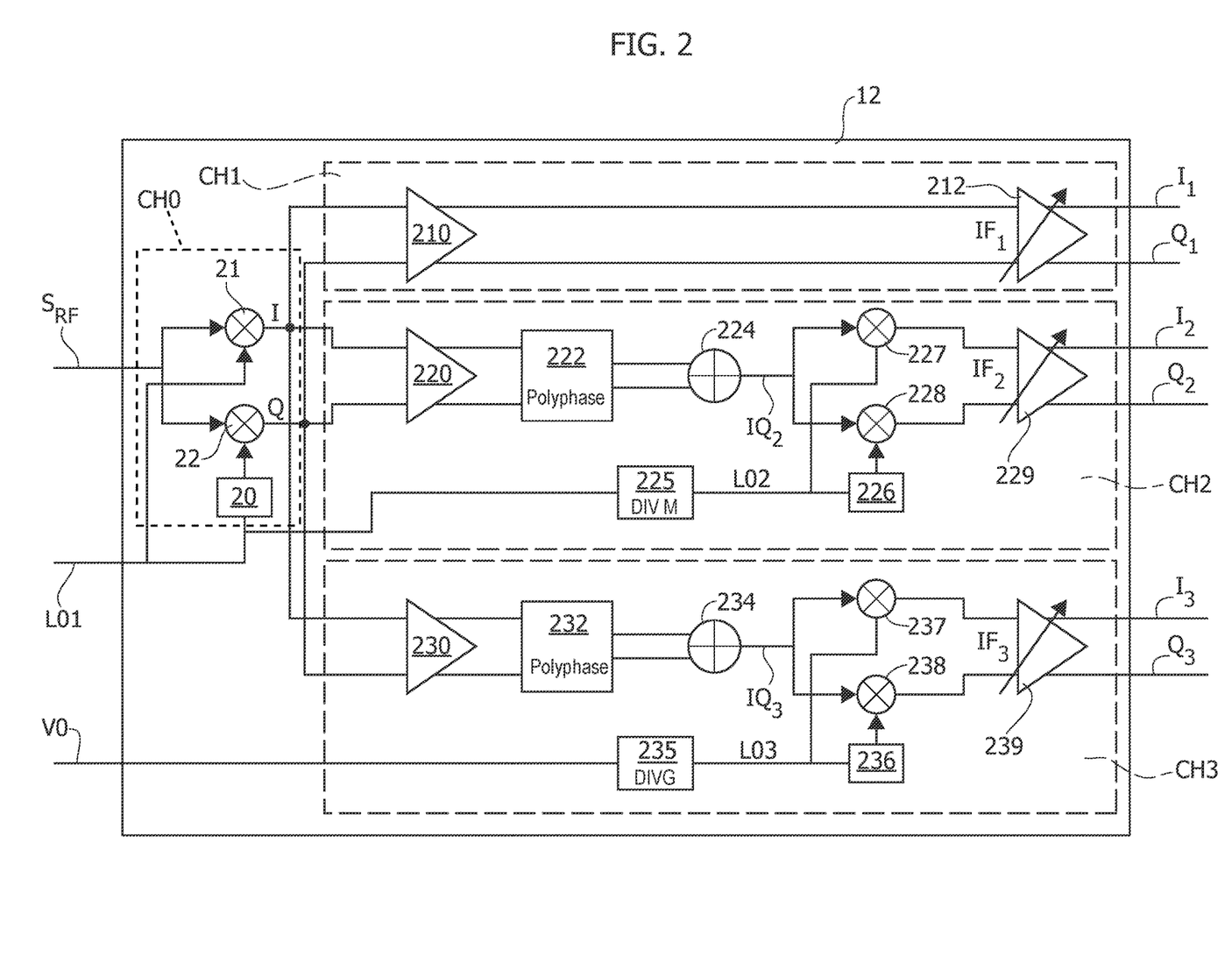
FIG. 2 is a diagram exemplary of a portion of the system exemplified in FIG. 1.

As exemplified in FIG. 2, the RF front end 12 includes: a quadrature demodulator or I/Q mixer CH0 (known per se) coupled to the antenna RX (optionally, via a low-noise amplifier) to receive the RF signal $S_{RF}$ and coupled to the PLL 11 to receive the local oscillator signal LO1 therefrom; the quadrature demodulator CH0 comprises a phase-shifter 20, a first "in-phase" mixer 21 and a second "quadrature" mixer 22, where the first mixer 21 of the quadrature demodulator 21, 22 provides a first "in-phase" component I of the (optionally, amplified) RF signal $S_R$F by mixing the RF signal with the local oscillator signal LO1 while the second mixer 22 of the quadrature demodulator CH0 provides a second "quadrature" component Q of the (optionally, amplified) RF signal $S_{RF}$ by mixing the RF signal $S_{RF}$ with a quadrature version of the local oscillator signal LO1, that is phase-shifted by 90 degrees via phase-shifter 20; a first signal processing channel CH1 coupled to the quadrature demodulator CH0 to receive the in-phase I and quadrature Q components of the RF signal $S_{RF}$, the first signal processing channel CH1 configured to apply a first signal processing to the in-phase I and quadrature Q components of the RF signal $S_{RF}$ to provide the first pair of processed signals $I_1$, $Q_1$; a second signal processing channel CH2 coupled to the quadrature demodulator 20, 21, 22 to receive the in-phase I and quadrature Q components of the RF signal $S_{RF}$ and coupled to the PLL 11 to receive the local oscillator signal LO1 therefrom, the second signal processing channel CH2 configured to apply a second signal processing to the in-phase I and quadrature Q components of the RF signal $S_{RF}$ and to the local oscillator LO1 to provide the second pair of processed signals $I_2$, $Q_2$; and a third signal processing channel CH3 coupled to the quadrature demodulator 20, 21, 22 to receive the in-phase I and quadrature Q components of the RF signal $S_{RF}$ and coupled to the PLL 11 to receive the signal VO from the voltage-controlled oscillator VCO in the PLL 11, the third signal processing channel CH3 configured to apply a third signal processing to the in-phase I and quadrature Q components of the RF signal $S_{RF}$ and to the VCO signal VO to provide the third pair of processed signals $I_3$, $Q_3$.

As appreciable to those of skill in the art, the modulated RF signal may be expressed as:

$$S_{RF}(t)=S(t)\cos(2\pi F_C t+\varphi)+IM(t)\cos(2\pi(2F_{LO1}-F_C)t+\sigma),$$

where $F_C$ is a carrier frequency of the RF signal $S_{RF}$, $\varphi$ is a first initial phase, $\sigma$ is a second initial phase, $F_{LO1}$ is a frequency of the local oscillator signal LO1, S(t) is the desired signal component, and IM(t) is the image signal component.

Figure 3A:
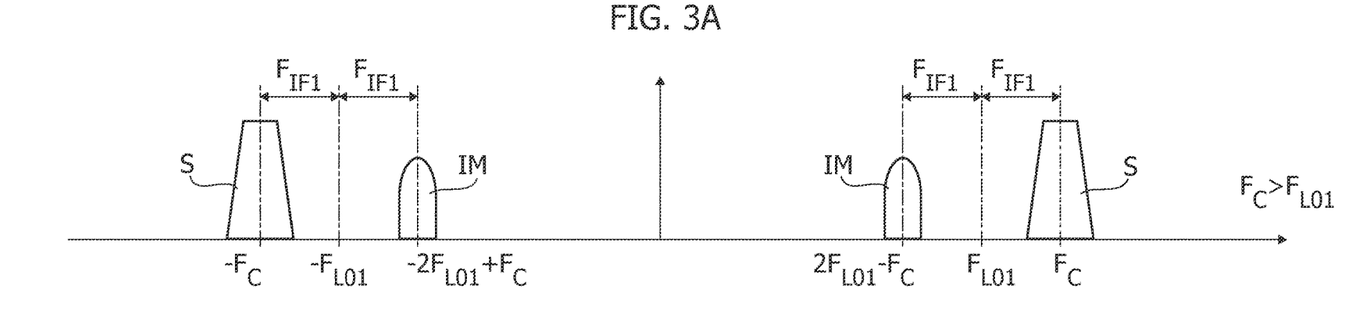
FIGS. 3A, 3B and 3C are diagrams exemplary of principles underlying one or more embodiments.
Figure 3B:
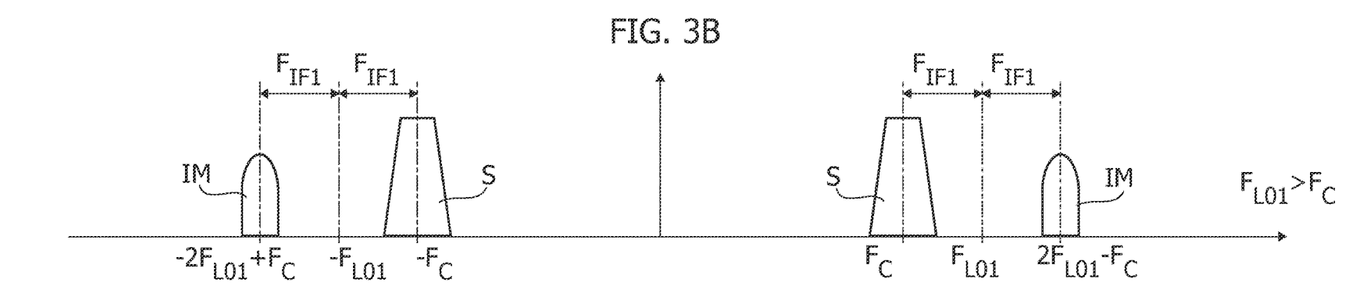

As exemplified in FIGS. 3A and 3B, both in case the carrier frequency $F_C$ is greater than the local oscillator frequency $F_{LO1}$ and vice versa, the desired signal component S is superimposed on the carrier frequency FC while the image signal component IM is superimposed at a frequency twice the local oscillator minus the carrier frequency (e.g., $2*F_{LO1}-F_C$).

Figure 3C:
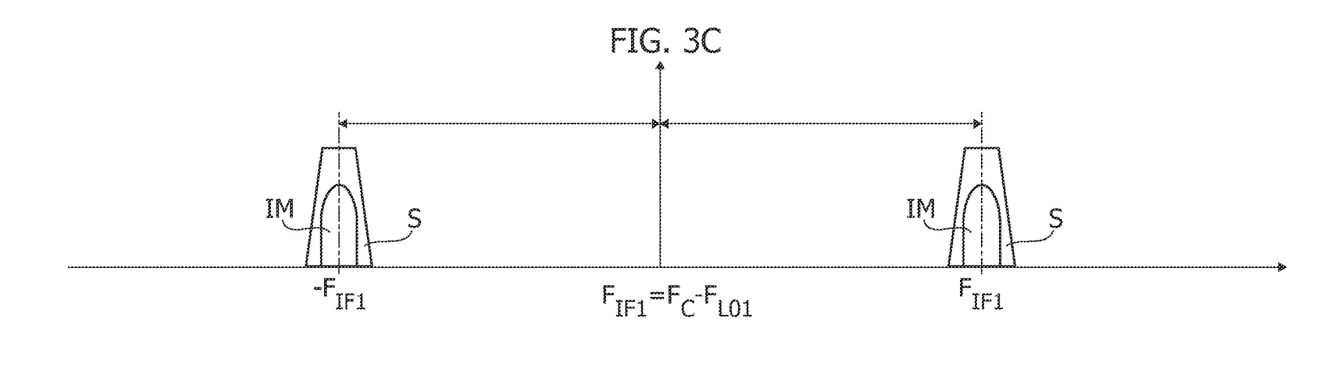

As exemplified in FIG. 3C, after mixing the RF signal $S_{RF}$ in the quadrature mixer 20, 21, 22, both the desired signal component S and the image signal IM are displaced towards an "intermediate frequency" (briefly, IF) $F_{IF1}$ which is in a range of frequencies between base band and radio frequency, e.g., $F_{IF1}=F_C-F_{LO1}$. For instance, in-phase component I and quadrature component Q are at this intermediate frequency IF and are indicative of the desired signal component S and of the image signal component IM.

As exemplified in FIG. 2, each of the processing chains is configured to generate an IF signal by processing and combining intermediate signals in phase I and in quadrature Q so as to delete the contribution of the image signal I with respect to the IF signal displaced at the IF frequency as exemplified in FIG. 3C.

For instance, the in-phase component I may be expressed as:

$$I=S(t)\cos(2\pi F_{IF1}t+\varphi-\pi)+IM(t)\cos(2\pi F_{IF1}t+\sigma-\sigma)$$

while the quadrature component Q may be expressed as:

$$Q=S(t)\sin(2\pi F_{IF1}t+\varphi-\theta)-IM(t)\sin(2\pi F_{IF1}t+\sigma-\theta),$$

where FIF1 is the first intermediate frequency, $\varphi$ is a first signal phase, $\square$ is a second signal phase.

As exemplified in FIG. 2, the first signal processing chain CH1 comprises: a first buffer 210 having a first buffer input node coupled to the first mixer 21 to receive the in-phase component I and a second buffer input node coupled to the second mixer 22 to receive the quadrature component Q, the first buffer 210 configured to provide a first IF signal IF1 based on the I and Q components provided by the quadrature demodulator 20, 21, 22; and a first variable gain amplifier (briefly, VGA) 212 coupled to the first buffer 210 to receive the first IF signal IF1 and to apply variable gain amplification 212 thereto (and, optionally, also anti-alias filtering), providing the first processed signal $I_1$ and the second processed signal $Q_1$ of the first pair of processed signals $I_1$, $Q_1$.

As exemplified in FIG. 2, the second signal processing chain CH2 includes: a second buffer 220 having a first buffer input node coupled to the first mixer 21 to receive the in-phase component I and a second buffer input node coupled to the second mixer 22 to receive the quadrature component Q; a filtering stage 222, such as a polyphase filter (e.g., a Hartley or Weaver filter, known per se), configured to apply signal filtering to the I and Q components provided by the quadrature demodulator 20, 21, 22; for instance, the filtering stage 222 may be tuned to remove the image signal of GNSS signals in a first frequency band selected out of L5, E5a and B2a frequency bands; an adder stage 224 configured to combine therebetween the filtered I/Q components, providing a second IF signal IQ2 as a superposition of the filtered I/Q components; a LO frequency divider 225 coupled to the PLL 11 to receive the local oscillator signal LO1 therefrom, the LO frequency divider 225 being configured to apply frequency division (e.g., via a programmable scaling factor M) to the local oscillator signal LO1, providing a second LO signal LO2 having a second LO frequency $F_{LO2}$ that is a fraction of the local oscillator frequency $F_{LO1}$ (e.g., $F_{LO2}=F_{LO1}/M$); a second quadrature demodulator 226, 227, 228, comprising a 90° phase-shifter 228, a second "in-phase" mixer 226 and a second "quadrature" mixer 227, where the second in-phase mixer 226 of the second quadrature demodulator 226, 227, 228 provides a first "in-phase" component $I_2$ of the second IF signal IF2, mixing the second IF signal IF2 with the second local oscillator signal LO2, while the second quadrature mixer 226 of the quadrature demodulator 226, 227, 228 provides a second "quadrature" component $Q_2$ of the second IF signal IF2, mixing the second IF signal IF2 with a quadrature version of the second local oscillator signal LO2, that is phase-shifted by 90 degrees via phase-shifter 226; and a second VGA 229 coupled to the second quadrature mixer 226, 227, 228 and configured to receive the image and quadrature signals from the second quadrature demodulator 226, 227, 228, the second VGA 229 configured to provide the third $I_2$ and fourth $Q_2$ processed signals.

For instance, document Fayrouz. Haddad, Lakhdar Zaid, Wenceslas Rahajandraibe, Oussama Frioui: "Polyphase Filter Design Methodology for Wireless Communication Applications", Salma Ait Fares, Mobile and Wireless Communications, Network layer and circuit level design, IntechOpen, pp. 219-246, 2010, doi: 10.5772/7707 hal-01895400 discusses a filter stage 222 suitable for use in one or more embodiments.

For instance, the signal IQ2 comprises the signal at the first intermediate frequency FIF1 cleaned from the image signal and may be expressed as:

$$IQ_2(t)=S(t)\cos(2\pi|F_{IF1}|t+\varphi)+IM(t)\cos(2\pi(2|F_{IF1}|-|F_{IF1}|)t+\sigma),$$

where $F_{LO1}$ is the frequency of the local oscillator signal LO1.

As exemplified in FIG. 2, the off-loop frequency divider 235 is used to bring the signal components I, Q at the first intermediate frequency IF1 down to a further reduced intermediate frequency IF2, e.g., with IF2=IF1−LO2. This may facilitate further signal processing by the subsequent A/D converter circuitry 14, for instance.

For instance, an in-phase signal $I_{F2}$ and a quadrature signal $Q_{IF2}$ produced by the second down-conversion stage 226, 227, 228, can be expressed as:

$$I_{IF2}=S(t)\cos(2\pi F_{IF2}t+\varphi-\theta)+IM(t)\cos(2\pi F_{IF2}t+\sigma-\theta)$$

$$Q_{IF2}=S(t)\sin(2\pi F_{IF2}t+\varphi-\theta)+IM(t)\sin(2\pi F_{IF2}t+\sigma-\theta)$$

where $F_{IF2}$ is the second intermediate frequency, e.g., $F_{IF2}=|F_{IF2}|-|F_{LO2}|$.

As exemplified in FIG. 2, the third signal processing chain CH3 includes: a third buffer 230 having a first buffer input node coupled to the first in-phase mixer 21 to receive the in-phase component I and a second buffer input node coupled to the second mixer 22 to receive the quadrature component Q; a third filtering stage 232, such as a polyphase filter as in the case of the second filtering stage 222 but tuned to work in a different frequency (e.g., for GNSS signals in a second frequency band selected out of L2 and BW3 frequency bands), configured to apply signal filtering to the I and Q components provided by the quadrature demodulator 20, 21, 22; a further adder stage 234 configured to combine therebetween the filtered I/Q components, providing a third IF signal IQ3 as a superposition of the filtered I/Q components; a VCO frequency divider 235 coupled to the PLL 11 to receive the VCO signal VO therefrom, the VCO frequency divider 235 being configured to apply frequency division (e.g., via a programmable scaling factor G) to the VCO signal VO, providing a third LO signal LO3 having a third frequency $F_{LO3}$ that is a fraction of the VCO frequency $F_{LO3}$ (e.g., $F_{LO3}=F_{LO2}/G$); a third quadrature demodulator 236, 237, 238, comprising a 90° phase-shifter 238, a third "in-phase" mixer 236 and a third "quadrature" mixer 238, where the third in-phase mixer 236 of the third quadrature demodulator 236, 237, 238 provide a third "in-phase" component $I_3$ of the third IF signal IF3, mixing the third IF signal IF3 with the third local oscillator signal LO3, while the third quadrature mixer 236 of the quadrature demodulator 236, 237, 238 provides a third "quadrature" component $Q_{IF3}$, mixing the third IF signal IQ3 with a quadrature version of the third local oscillator signal LO3, that is phase-shifted by 90 degrees via phase-shifter 236; and a third VGA 239 coupled to the third quadrature mixer 236, 237, 238 and configured to receive the image $I_{IF3}$ and quadrature $Q_{IF3}$ signals from the third quadrature demodulator 236, 237, 238, the third VGA 239 configured to provide the fifth $I_3$ and sixth $Q_3$ processed signals.

As exemplified herein, the third filtering stage 232 is configured to filter the image signal from the second IF signal at the second intermediate frequency signal IF2, producing the signal IQ3 as a result.

For instance, the VCO frequency divider 235 uses a scaling factor G about 18 or 20, providing the third LO signal LO3 with a third LO frequency $F_{LO3}$ which is a fraction G of the frequency of VCO, e.g., $F_{LO3}=F_{VCO}/G=F_{VCO}/18$ or $F_{VCO}/20$.

It is noted that the phase shifters 20, 226 and 236 exemplified in FIG. 2 are purely exemplary an in in no way mandatory, as in one or more embodiments the signals LO1, LO2, LO3 can be provided (e.g., by respective divider blocks) as a pair of phase-shifted signals in quadrature therebetween.

As exemplified in FIG. 2, the scaling factor G of the VCO divider 235 is an even integer number so as to provide the local oscillator to the third quadrature mixer 236, 237, 238.

For instance, the presence of the VCO divider 235 facilitates obtaining signals I3, Q3 which have a lower intermediate frequency $F_{IF3}$ with respect to the signals I, Q provided by the first quadrature mixer 20, 21, 22, e.g., $I_{F3}<I_{F1}$. This facilitates further processing by the A/D converter circuitry 14, for instance.

As exemplified herein, a system 12 includes: an input node $S_{RF}$ configured to receive a set of global navigation satellite system, GNSS signals $S_o$, $S_N$ transmitted from a plurality of GNSS satellites $SC_o$, $SC_N$ over a set of carrier frequencies $f_1$, $f_{11}$, $f_2$, $f_{3A1}$, $f_{3A2}$, $f_{3B1}$, $f_{3B2}$, $F_C$; a phase-locked loop, PLL 11 configured to provide a first local oscillator signal LO1 and a voltage-controlled oscillator, VCO signal VO; and a first quadrature demodulator CH0 coupled to the input node and to the PLL, the first quadrature demodulator CH0 configured to apply quadrature demodulation processing 20, 21, 22 to the set of GNSS signals based on the local oscillator signal received from the PLL, the first quadrature demodulator providing a first set of in-phase signals I and a first set of quadrature signals Q as a result.

For instance, in-phase signals of the first set of in-phase signals and quadrature. signals of the first set of quadrature signals have a first intermediate frequency $F_{IF1}$ lower than carrier frequencies of the set of carrier frequencies of GNSS signals of the set of GNSS signals.

As exemplified herein, the system further comprises: a first signal processing chain CH1 coupled to the first quadrature demodulator to receive the set of in-phase signals and the set of quadrature signals, the first signal processing chain comprising a first variable gain amplifier, VGA 212 coupled to the first quadrature demodulator, the VGA configured to apply a first variable gain amplification to the first set of in-phase signals and to the first set of quadrature signals, providing a first in-phase signal component I, and a first quadrature signal component $Q_1$ as a result; a second signal processing chain CH2 coupled to the first quadrature demodulator to receive the first set of in-phase signals and the first set of quadrature signals and coupled to the PLL to receive the first local oscillator signal, the second signal processing chain comprising: a first polyphase filter 222 configured to apply polyphase filtering to the first set of in-phase signals and to the first set of quadrature signals, producing a first set of filtered in-phase signals and a first set of filtered quadrature signals as a result; a first adder 224 coupled to the first polyphase filter to receive the first set of filtered in-phase signals and the first set of filtered quadrature signals, the first adder configured to provide a first sum signal $IQ_2$ as a sum of the first set of filtered in-phase signals and the first set of filtered quadrature signals; a first frequency divider 225 configured to apply frequency division to the first local oscillator signal, producing a second local oscillator signal LO2 as a result, wherein the second local oscillator signal has a second local oscillator frequency that is a fraction of the frequency of the local oscillator signal; a second quadrature demodulator 226, 227, 228 coupled to the adder and to the first frequency divider, the second quadrature demodulator 226, 227, 228 configured to apply second quadrature demodulation processing to the first sum signal, providing, based on the second local oscillator signal, a second set of in-phase signals and a second set of quadrature signals, the second set of in-phase signals and the second set of quadrature signals having a second intermediate frequency IF2 lower than the first intermediate frequency, and a second VGA 229 configured to apply a second variable gain amplification to the second set of in-phase signals and to the second set of quadrature signals, the second VGA configured to produce a second in-phase signal component $I_2$ and a second quadrature signal component $Q_2$ as a result; a third signal processing chain CH3 coupled to the first quadrature demodulator to receive the set of in-phase signals and the set of quadrature signals and coupled to the PLL to receive the VCO signal, the third signal processing chain comprising: a second polyphase filter 232 configured to apply second polyphase filtering to the first set of in-phase signals and to the first set of quadrature signals, producing a second set of filtered in-phase signals and a second set of filtered quadrature signals as a result; a second adder 234 coupled to the second polyphase filter to receive the second set of filtered in-phase signals and the second set of filtered quadrature signals therefrom, the second adder configured to provide a second sum signal $IQ_3$ as a sum of the second set of filtered in-phase signals and the second set of filtered quadrature signals; a second frequency divider 235 configured to apply a second frequency division to the VCO signal, producing a third local oscillator signal LO3 as a result, wherein the third local oscillator signal has a third local oscillator frequency that is a fraction of the frequency of the VCO signal; a third quadrature demodulator 236, 237, 238 coupled to the second adder and to the second frequency divider, the third quadrature demodulator 236, 237, 238 configured to apply third quadrature demodulation processing to the second sum signal, providing, based on the third local oscillator signal, a third set of in-phase signals and a third set of quadrature signals, the second set of in-phase signals and the second set of quadrature signals having a third intermediate frequency IF3 lower than the second intermediate frequency, and a third VGA 239 configured to apply a third variable gain amplification to the third set of in-phase signals and to the third set of quadrature signals, the third VGA configured to produce a third in-phase signal component $I_3$ and a third quadrature signal component $Q_3$ as a result.

As exemplified herein, the first local oscillator signal has a first local oscillator frequency that is fraction of the frequency of the VCO signal.

As exemplified herein, the first frequency divider is configured to apply frequency division using a first programmable frequency division factor.

As exemplified herein, the second frequency divider is configured to apply frequency division using a second programmable frequency division factor, preferably programmable in a range 18 to 20.

As exemplified herein, GNSS signals of the set of GNSS signals transmitted from a plurality of GNSS satellites over a set of carrier frequencies comprise signals transmitted over frequency bands distinct and separate BW1, BW2, BW3A, BW3B.

As exemplified herein, GNSS signals of the set of GNSS signals transmitted from a plurality of GNSS satellites over the set of carrier frequencies comprise at least two of: a first GNSS signal $S_o$ transmitted over a first carrier frequency $f_1$, $f_{11}$; a second GNSS signal $S_N$ transmitted over a second carrier frequency $f_2$, the second carrier frequency higher than the first carrier frequency; or a third GNSS signal $S_{RF}$ transmitted over a third carrier frequency $f_{3A1}$, $f_{3A2}$, $f_{3B1}$, $f_{3B2}$ higher than the second carrier frequency.

As exemplified herein, the first set of in-phase signals and the first set of quadrature signals comprise at least one image signal component, and the first polyphase filter is configured to filter at least one image signal component of the first set of in-phase signals and of the first set of quadrature signals, producing the first set of filtered in-phase signals and the first set of filtered quadrature signals exempt from at least one image signal component as a result.

As exemplified herein, the first set of in-phase signals and the first set of quadrature signals comprise at least one image signal component and the second polyphase filter is configured to filter at least one image signal component of the first set of in-phase signals and the first set of quadrature signals, producing the second set of filtered in-phase signals and the second set of filtered quadrature signals exempt from at least one image signal component as a result.

As exemplified herein, a (e.g., RF) receiver 100 includes: a system 12 as per the present disclosure; an antenna RX configured to receive the set of GNSS signals and coupled to the to the input node of the system to provide the received set of GNSS signals thereto; a set of analog-to-digital converter, ADC, circuits 14 coupled to the first signal processing chain, the second signal processing chain and to the third signal processing chain, the set of ADC circuits configured to apply analog-to-digital conversion to the first in-phase component, the first quadrature component, the second in-phase component, the second quadrature component, the third in-phase component and the third quadrature component, providing a set of digital signal components as a result.

As exemplified herein, the receiver comprises a baseband circuit block 16 coupled to the set of ADC circuits 14, the base stand circuit block configured to apply baseband signal processing to the set of digital signals received from the set of ADC converters.

As exemplified herein, the set of ADC converter circuits is configured to apply the analog-to-digital conversion based on a sampling signal $F_S$ having a sampling frequency that is a multiple of a fundamental GNSS frequency.

Figure 4:
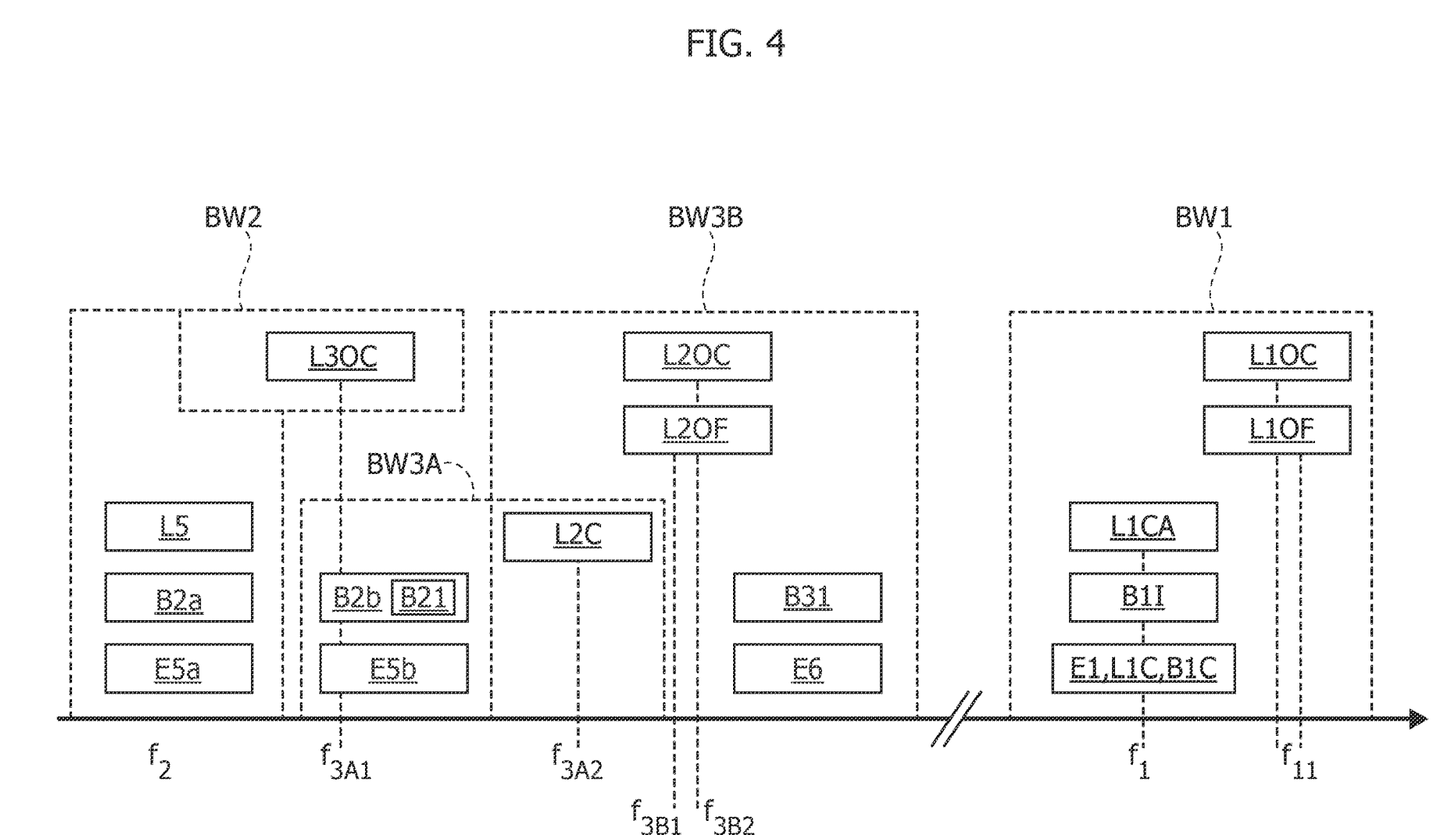
FIG. 4 is a diagram exemplary of frequency bands used in possible applicative scenarios.

As exemplified in FIG. 4, the system exemplified in FIGS. 1 and 2 can be used to process signals which have a carrier frequency band $F_C$ that may fall in a variety of frequency bands such as, for instance: a first frequency band BW1 comprising signals that fall in a first frequency range $f_1$-$f_{11}$, e.g., between 1559 MHz and 1606 MHz; a second frequency band BW2, e.g., centered around a second frequency band $f_2$, such as a frequency about 1176 MHz; a third frequency band BW3A in a third frequency range, e.g., $f_{3A1}$-$f_{3A2}$ between 1200 MHz and 1250 MHz, such as 1207.14 MHz, for instance; and a fourth frequency band BW3B in a fourth frequency range $f_{3B1}$-$f_{3B2}$, such as between 1258 MHz and 1289 MHz, for instance.

For instance, GNSS signals $S_o, \ldots, S_N$ may be transmitted and received from satellites in a variety of known GNSS constellations using any of these frequency bands BW1, BW2, BW3A, BW4A.

For instance, the first signal processing chain CH1 may be suitable to process a RF signal received in the first frequency band BW1, e.g., from a first set of GNSS constellation of satellites L1CA, E1, L1C, B1C, B1I, LOF1, L1OC and/or any other signal in these frequency bands.

For instance, the second signal processing chain CH2 may be suitable to process a RF signal received in the second frequency band BW2, e.g., from a second set of constellations L5, B2a, E5a.

For instance, the third signal processing chain CH3 may be suitable to process a RF signal $S_{RF}$ received in the third frequency band BW3A (e.g., from a third set of constellations L2C, B2b, B2I, E5b, L3OC) or in the fourth frequency band BW3B (e.g., from a fourth set of constellations L2OC, L2OF, B31, E6).

Table II provided at the end of the description exemplifies settings of the first signal processing chain CH1, such as carrier frequency $F_C$, bandwidth BW, VCO signal frequency $F_{VCO}$, first local oscillator signal frequency $F_{LO1}$ and intermediate frequency IF1 which may be used to process signals from a variety of constellations configured to transmit signals over frequency bands (e.g., L1c/a, L1C, E1, B1I, B1C, LOF1) in the first bandwidth BW1.

Table III provided at the end of the description exemplifies settings of the second signal processing chain CH2, such as carrier frequency $F_C$, bandwidth BW, VCO signal frequency $F_{VCO}$, first local oscillator signal frequency $F_{LO1}$, second LO signal frequency $F_{LO2}$, scaling factor M, intermediate frequency IF2 and maximum frequency Max F which may be used to process signals from a variety of the constellations configured to transmit signals over frequency bands (e.g., L5, such as GPS and others, B2a, E5a) in the second bandwidth BW2.

Table IV provided at the end of the description exemplifies settings of the third signal processing chain CH3, such as carrier frequency $F_C$, bandwidth BW, VCO signal frequency $F_{VCO}$, first local oscillator signal frequency $F_{LO1}$, third local oscillator signal frequency $F_{LO3}$, scaling factor G, third intermediate frequency IF3 and maximum frequency Max F which may be used to process signals from a variety of constellations configured to transmit over frequency bands (e.g., L2C, B2b, B21, E5b) in the third bandwidth BW3A.

Table V provided at the end of the description exemplifies of the third signal processing chain CH3 such as carrier frequency $F_C$, bandwidth BW, VCO signal frequency $F_{VCO}$, first local oscillator signal frequency $F_{LO1}$, third local oscillator signal frequency $F_{LO3}$, scaling factor G, third intermediate frequency IF3 and maximum frequency Max F which may be used to process signals from a variety of constellations configured to transmit over frequency bands (e.g., alternative constellations L20C, L2OF, B31, E6) in the fourth bandwidth BW3B.

Table VI provided at the end of the description is exemplary of combinations of constellations and respective names of channels that may be used to process signals received from such exemplary combinations of constellations.

As exemplified in Table VI, the system as exemplified in FIGS. 1 and 2 provides flexibility to deal with a wide variety of application scenarios, as those listed in the Table VI are purely exemplary an in no way limiting.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection. The extent of protection is defined by the annexed claims.

TABLE I

| K | LO1/K | $2^n * fo$ |
|---|---|---|
| 6 | 256 * fo | n = 8 |
| 12 | 128 * fo | n = 7 |
| 24 | 64 * fo | n = 6 |
| 48 | 32 * fo | n = 5 |
| 96 | 16 * fo | n = 4 |

TABLE II

| Constell. frequency band | $F_C$ [MHz] | BW [MHz] | $F_{VCO}$ [MHz] | $F_{LO1}$ [MHz] | IF1 [MHz] | Max F [MHz] |
|---|---|---|---|---|---|---|
| L1C/A or L1C | 1575.42 | 2.046 | 6285.5 | 1571.375 | 4.045 | 5.068 |
| E1 | 1575.42 | 4.092 | 6285.5 | 1571.375 | 4.045 | 6.091 |
| B1I | 1561.098 | 4.092 | 6285.5 | 1571.375 | −10.277 | 12.323 |
| B1C | 1575.42 | 32.736 | 6285.5 | 1571.375 | 4.045 | 20.413 |
| LOF1 | 1602 | 7.875 | 6285.5 | 1571.375 | 30.625 | 34.5625 |

TABLE III

| Constell. name or frequency band | $F_C$ [MHz] | BW [MHz] | $F_{VCO}$ [MHz] | $F_{LO1}$ [MHz] | IF1 [MHz] | M | $F_{LO2}$ [MHz] | IF2 [MHz] | Max F [MHz] |
|---|---|---|---|---|---|---|---|---|---|
| GPS - L5 | 1176.45 | 20.46 | 6285.5 | 1571.375 | 394.925 | 4 | 392.8438 | 2.08125 | 12.31125 |
| E5A | 1176.45 | 20.46 | 6285.5 | 1571.375 | 394.925 | 4 | 392.8438 | 2.08125 | 12.31125 |

TABLE III-continued

| Constell. name or frequency band | $F_C$ [MHz] | BW [MHz] | $F_{VCO}$ [MHz] | $F_{LO1}$ [MHz] | IF1 [MHz] | M | $F_{LO2}$ [MHz] | IF2 [MHz] | Max F [MHz] |
|---|---|---|---|---|---|---|---|---|---|
| B2A | 1176.45 | 20.46 | 6285.5 | 1571.375 | 394.925 | 4 | 392.8438 | 2.08125 | 12.31125 |
| IRNSS -L5 | 1176.45 | 2.046 | 6285.5 | 1571.375 | 394.925 | 4 | 392.8438 | 2.08125 | 3.10425 |

TABLE IV

| Constell. frequency band | $F_C$ [MHz] | BW [MHz] | $F_{VCO}$ [MHz] | FLO1 [MHz] | IF1 [MHz] | G | $F_{LO3}$ [MHz] | IF3 [MHz] | Max F [MHz] |
|---|---|---|---|---|---|---|---|---|---|
| L2C | 1227.6 | 1.023 | 6285.5 | 1571.375 | 343.775 | 18 | 349.1944 | 5.419444 | 5.930944 |
| E5b | 1207.14 | 20.46 | 6285.5 | 1571.375 | 364.235 | 18 | 349.1944 | −15.0406 | 25.27056 |
| B2I | 1207.14 | | 6285.5 | 1571.375 | 364.235 | 18 | 349.1944 | −15.0406 | |
| B2B | 1207.14 | 20.46 | 6285.5 | 1571.375 | 364.235 | 18 | 349.1944 | −15.0406 | 25.27056 |
| LOF2 | 1246 | 6.125 | 6285.5 | 1571.375 | 325.375 | 18 | 349.1944 | 23.81944 | 26.88194 |
| L20C | 1248.06 | 2.046 | 6285.5 | 1571.375 | 323.315 | 18 | 349.1944 | 25.87944 | 26.90244 |
| L30C | 1202.025 | 2.046 | 6285.5 | 1571.375 | 369.35 | 18 | 349.1944 | −20.1556 | 21.17856 |

TABLE V

| Constell. frequency band | $F_C$ [MHz] | BW [MHz] | $F_{VCO}$ [MHz] | $F_{LO1}$ [MHz] | IF1 [MHz] | G | $F_{LO3}$ [MHz] | IF3 [MHz] | Max F [MHz] |
|---|---|---|---|---|---|---|---|---|---|
| L2C | 1227.6 | 1.023 | 6285.5 | 1571.375 | 343.775 | 20 | 314.275 | −29.5 | 30.0115 |
| E6I | 1278.75 | 10.23 | 6285.5 | 1571.375 | 292.625 | 20 | 314.275 | 21.65 | 26.765 |
| B3I | 1268.52 | 20.46 | 6285.5 | 1571.375 | 302.855 | 20 | 314.275 | 11.42 | 21.65 |

TABLE VI

| L1C/A | L2C | LOF1 | LOF2 | E1 | E5b | B1I | B2I | | | | CH1, CH3 |
|---|---|---|---|---|---|---|---|---|---|---|---|
| 1575.42 | 1227.6 | 1602 | 1246 | 1575.42 | 1207.14 | 1561.09 | 1207.14 | | | | |
| L1C/A or L1C | L2C | LOF1 | LOF2 | E1 | E5b | B1I | B1C | B2I | B2B | | CH1, CH3 |
| 1575.42 | 1575.42 | 1227.6 | 1602 | 1245 | 1575.42 | 1207.14 | 1561.09 | 1575.42 | 1207.14 | 1207.14 | |
| L1C/A | L5 | E1 | E5A | B1I | B2A | L5 | | | | | CH1, CH2 |
| 1575.42 | 1176.45 | 1575.42 | 1176.45 | 1561.09 | 1176.45 | 1176.45 | | | | | |
| L1C/A or L1C | L2C | E1 | E5A | B1I or B1C | B2A | L5 | | | | | CH1, CH2 |
| 1575.42 | 1575.42 | 1176.45 | 1575.42 | 1176.45 | 1561.09 | 1575.42 | 1176.45 | 1176.45 | | | |
| L1C/A or L1C | L2C | E1 | E6I | B1I or B1C | B3I | | | | | | CH1, CH3 |
| 1575.42 | 1575.42 | 1227.6 | 1575.42 | 1278.75 | 1561.09 | 1575.42 | 1268.52 | | | | |
| L1C/A | L2C | L5 | E1 | E5B | E5A | B1I | B2I | B2A | | | CH1, CH2, CH3 |
| 1575.45 | 1227.6 | 1176.45 | 1575.42 | 1207.14 | 1176.45 | 1561.09 | 1207.14 | 1176.45 | | | |
| L1C/A or L1C | L2C | L5 | E1 | E5B | E5A | B1I or B1C | B2I or B2B | B2A | | | CH1, CH2, CH3 |
| 1575.42 | 1575.42 | 1227.6 | 1176.45 | 1575.42 | 1207.14 | 1176.45 | 1561.09 | 1575.42 | 1207.14 | 1207.14 | 1176.45 |
| L1C/A or L1C | L2C | L5 | E1 | E6I | E5A | B1I or B1C | B3I | B2A | | | CH1, CH2, CH3 |
| 1575.42 | 1575.42 | 1227.6 | 1176.45 | 1575.42 | 1278.75 | 1176.45 | 1561.09 | 1575.42 | 1268.52 | 1176.45 | |
| L1C | L2C | L5 | L1OC | L2OC | L3OC | | | | | | CH1, CH2, CH3 |
| 1575.42 | 1227.6 | 1176.45 | 1600.99 | 1248.06 | 1202.02 | | | | | | |

What is claimed is:

1. A system, comprising:
  a phase-locked loop (PLL) configured to provide a first local oscillator (LO) signal and a voltage-controlled oscillator (VCO) signal having a signal frequency higher than the first local oscillator signal;
  a first quadrature demodulator configured to downconvert global navigation satellite system (GNSS) signals received from a plurality of GNSS satellites over a set of carrier frequencies to produce a first intermediate frequency (IF) signal;
  a first signal processing chain configured to pass the first IF signal;
  a second signal processing chain comprising a first frequency divider configured to produce a second LO signal based on the first LO signal, and a second quadrature demodulator configured to convert the first IF signal to a second IF signal based on the second LO signal; and
  a third signal processing chain comprising a second frequency divider configured to produce a third LO signal based on the VCO signal, and a third quadrature demodulator configured to convert the first IF signal to a third IF signal based on the third LO signal.

2. The system of claim 1, further comprising a baseband processing circuit coupled to outputs of the first signal processing chain, the second signal processing chain, and the third signal processing chain.

3. The system of claim 2, further comprising a third frequency divider configured to receive the first LO signal and provide a baseband clock signal, wherein the baseband processing is configured to be clocked by the baseband clock signal.

4. The system of claim 2, further comprising a plurality of analog-to-digital converters (ADCs) coupled between the outputs of the outputs of the first signal processing chain, the second signal processing chain, and the third signal processing chain and the baseband processing circuit.

5. The system of claim 4, wherein the plurality of ADCs are clocked using a sampling frequency that is a multiple of a fundamental GNSS frequency.

6. The system of claim 1, wherein:
  the first signal processing chain is configured to receive signals from a first plurality of GNSS satellites over a first subset of the set of carrier frequencies within a first frequency range;
  the second signal processing chain is configured to receive signals from a second plurality of GNSS satellites over a second subset of the set of carrier frequencies within a second frequency range lower than the first frequency range; and
  the third signal processing chain is configured to receive signals from a third plurality of GNSS satellites over a third subset of the set of carrier frequencies within a third frequency range lower than the first frequency range and higher than the second frequency range.

7. The system of claim 6, further comprising a fourth frequency divider configured to receive the first LO signal and provide a processor clock signal, wherein:
  harmonics of the processor clock signal do not fall within the first frequency range, the second frequency range, and the third frequency range.

8. The system of claim 1, wherein:
  the first frequency divider has a division ratio of 4;
  the second frequency divider has a division ratio in a range of 18 to 20; and
  the first LO signal has a frequency that is ¼ of the VCO signal frequency.

9. The system of claim 1, wherein:
  the first signal processing chain comprises a first variable gain amplifier (VGA);
  the second signal processing chain further comprises a first polyphase filter coupled between an output of the first quadrature demodulator and the second quadrature demodulator, and a second VGA coupled to an output of the second quadrature demodulator; and
  the third signal processing chain further comprises a second polyphase filter coupled between an output of the first quadrature demodulator and the third quadrature demodulator, and a third VGA coupled to an output of the second quadrature demodulator.

10. The system of claim 1, further comprising an antenna coupled to an input of the first quadrature demodulator.

11. A method, comprising:
  using a phase-locked loop (PLL), generating a first local oscillator (LO) signal and a voltage-controlled oscillator (VCO) signal having a signal frequency higher than a frequency of the first local oscillator signal;
  using a first quadrature demodulator configured to downconvert global navigation satellite system (GNSS) signals received from a plurality of GNSS satellites over a set of carrier frequencies to produce a first intermediate frequency (IF) signal;
  processing a first frequency band corresponding to a first plurality of GNSS satellites comprising passing the first IF signal to a baseband processor;
  processing second frequency band comprising dividing the first LO signal by a first division ratio to form a second LO signal, mixing the first IF signal with the second LO signal to form a second IF signal, and passing the second IF signal to the baseband processor; and
  processing third frequency band comprising dividing the VCO signal by a second division ratio to form a third LO signal, mixing the first IF signal with the third LO signal to form a third IF signal, and passing the third IF signal to the baseband processor, wherein the third frequency band is higher than the second frequency band, and the first frequency band is higher than the third frequency band.

12. The method of claim 11, further comprising:
  performing a first analog-to-digital conversion on the first IF signal before passing the first IF signal to the baseband processor;
  performing a second analog-to-digital conversion on the second IF signal before passing the second IF signal to the baseband processor; and
  performing a third analog-to-digital conversion on the second IF signal before passing the third IF signal to the baseband processor.

13. The method of claim 11, wherein:
  the first division ratio is 4;
  the second division ratio is in a range of 18 to 20; and
  the first LO signal has a frequency that is ¼ of the VCO signal frequency.

14. The method of claim 11, wherein:
  processing the first frequency band further comprises adjusting an amplitude of the first IF signal using a first variable gain amplifier;
  processing the second frequency band further comprises processing the first IF signal with a first polyphase filter before mixing the first IF signal with the second LO signal, and adjusting an amplitude of the second IF signal using a second variable gain amplifier; and processing the third frequency band further comprises processing the first IF signal with a second polyphase filter before mixing the first IF signal with the third LO signal, and adjusting an amplitude of the third IF signal using a third variable gain amplifier.

15. A system, comprising:

an input node configured to receive a set of global navigation satellite system (GNSS) signals transmitted from a plurality of GNSS satellites over a set of carrier frequencies;

a phase-locked loop, PLL configured to provide a first local oscillator signal and a voltage-controlled oscillator, VCO signal;

a first quadrature demodulator coupled to the input node and to the PLL, the first quadrature demodulator configured to apply quadrature demodulation processing to the set of GNSS signals based on the first local oscillator signal received from the PLL, the first quadrature demodulator providing a first set of in-phase signals and a first set of quadrature signals as a result, wherein in-phase signals of the first set of in-phase signals and quadrature signals of the first set of quadrature signals have a first intermediate frequency lower than carrier frequencies of the set of carrier frequencies of GNSS signals of the set of GNSS signals;

a first signal processing chain coupled to the first quadrature demodulator to receive the set of in-phase signals and the first set of quadrature signals, the first signal processing chain comprising a first variable gain amplifier, VGA coupled to the first quadrature demodulator, the VGA configured to apply a first variable gain amplification to the first set of in-phase signals and to the first set of quadrature signals, providing a first in-phase signal component and a first quadrature signal component as a result;

a second signal processing chain coupled to the first quadrature demodulator to receive the first set of in-phase signals and the first set of quadrature signals and coupled to the PLL to receive the first local oscillator signal, the second signal processing chain comprising:

a first polyphase filter configured to apply polyphase filtering to the first set of in-phase signals and to the first set of quadrature signals, producing a first set of filtered in-phase signals and a first set of filtered quadrature signals as a result, a first adder coupled to the first polyphase filter to receive the first set of filtered in-phase signals and the first set of filtered quadrature signals, the first adder configured to provide a first sum signal as a sum of the first set of filtered in-phase signals and the first set of filtered quadrature signals, a first frequency divider configured to apply frequency division to the first local oscillator signal, producing a second local oscillator signal as a result, wherein the second local oscillator signal has a second local oscillator frequency that is a fraction of the frequency of the first local oscillator signal, a second quadrature demodulator coupled to the adder and to the first frequency divider, the second quadrature demodulator configured to apply second quadrature demodulation processing to the first sum signal, providing, based on the second local oscillator signal, a second set of in-phase signals and a second set of quadrature signals, the second set of in-phase signals and the second set of quadrature signals having a second intermediate frequency lower than the first intermediate frequency, and a second VGA configured to apply a second variable gain amplification to the second set of in-phase signals and to the second set of quadrature signals, the second VGA configured to produce a second in-phase signal component and a second quadrature signal component as a result; and a third signal processing chain coupled to the first quadrature demodulator to receive the set of in-phase signals and the first set of quadrature signals and coupled to the PLL to receive the VCO signal, the third signal processing chain comprising:

a second polyphase filter configured to apply second polyphase filtering to the first set of in-phase signals and to the first set of quadrature signals, producing a second set of filtered in-phase signals and a second set of filtered quadrature signals as a result, a second adder coupled to the second polyphase filter to receive the second set of filtered in-phase signals and the second set of filtered quadrature signals therefrom, the second adder configured to provide a second sum signal as a sum of the second set of filtered in-phase signals and the second set of filtered quadrature signals, a second frequency divider configured to apply a second frequency division to the VCO signal, producing a third local oscillator signal as a result, wherein the third local oscillator signal has a third local oscillator frequency that is a fraction of the frequency of the VCO signal, and a third quadrature demodulator coupled to the second adder and to the second frequency divider, the third quadrature demodulator configured to apply third quadrature demodulation processing to the second sum signal, providing, based on the third local oscillator signal, a third set of in-phase signals and a third set of quadrature signals, the second set of in-phase signals and the second set of quadrature signals having a third intermediate frequency lower than the second intermediate frequency, and a third VGA configured to apply a third variable gain amplification to the third set of in-phase signals and to the third set of quadrature signals, the third VGA configured to produce a third in-phase signal component and a third quadrature signal component as a result.

16. The system according to claim 15, wherein:

the first local oscillator signal has a first local oscillator frequency that is fraction of the frequency of the VCO signal;

the first frequency divider is configured to apply frequency division using a first programmable frequency division factor; and the second frequency divider is configured to apply frequency division using a second programmable frequency division factor, programmable in a range of 18 to 20.

17. The system according to claim 15, wherein:

GNSS signals of the set of GNSS signals received from the plurality of GNSS satellites over the set of carrier frequencies comprise signals transmitted over frequency bands that are distinct and separate; and the GNSS signals of the set of GNSS signals transmitted from a plurality of GNSS over the set of carrier frequencies comprise at least two of:

a first GNSS signal transmitted over a first carrier frequency;

a second GNSS signal transmitted over a second carrier frequency, the second carrier frequency higher than the first carrier frequency; or a third GNSS signal transmitted over a third carrier frequency higher than the second carrier frequency.

18. The system according to claim 15, wherein:

the first set of in-phase signals and the first set of quadrature signals comprise at least one image signal component;

the first polyphase filter is configured to filter the at least one image signal component of the first set of in-phase signals and of the first set of quadrature signals, producing the first set of filtered in-phase signals and the first set of filtered quadrature signals exempt from at least one image signal component as a first result; and the second polyphase filter is configured to filter at least one image signal component of the first set of in-phase signals and the first set of quadrature signals, producing the second set of filtered in-phase signals and the second set of filtered quadrature signals exempt from at least one image signal component as a second result.

19. A receiver, comprising:

the system according to claim 15, an antenna configured to receive the set of GNSS signals and coupled to the input node of the system to provide the received set of GNSS signals thereto, a set of analog-to-digital converter (ADC) circuits, coupled to the first signal processing chain, the second signal processing chain and to the third signal processing chain, the set of ADC circuits configured to apply analog-to-digital conversion to the first in-phase signal component, the first quadrature signal component, the second in-phase signal component, the second quadrature signal component, the third in-phase signal component and the third quadrature signal component, providing a set of digital signal components as a result.

20. The receiver according to claim 19, further comprising a baseband circuit block coupled to the set of ADC circuits, the base stand circuit block configured to apply baseband signal processing to the set of digital signal components received from the set of ADC circuits.

21. The receiver according to claim 20, wherein the set of ADC circuits is configured to apply the analog-to-digital conversion based on a sampling signal having a sampling frequency that is a multiple of a fundamental GNSS frequency.

* * * * *